No. 666,707. Patented Jan. 29, 1901.
F. B. SHUSTER.
WIRE STRAIGHTENING AND CUTTING MACHINE.
(Application filed June 8, 1899.)
(No Model.) 4 Sheets—Sheet 1.

WITNESSES
H. A. Lamb
L. C. Hoyt

INVENTOR
Franklin B. Shuster
By his Atty.
Geo. D. Phillips

No. 666,707. Patented Jan. 29, 1901.
F. B. SHUSTER.
WIRE STRAIGHTENING AND CUTTING MACHINE.
(Application filed June 8, 1899.)
(No Model.) 4 Sheets—Sheet 2.

WITNESSES
H. A. Lamb
L. R. Hoyt

INVENTOR
Franklin B. Shuster
By his Atty.
Geo. D. Phillips

No. 666,707. Patented Jan. 29, 1901.
F. B. SHUSTER.
WIRE STRAIGHTENING AND CUTTING MACHINE.
(Application filed June 8, 1899.)
(No Model.) 4 Sheets—Sheet 3.

WITNESSES
H. A. Lamb
L. R. Hoyt

INVENTOR
Franklin B. Shuster
By his Atty.
Geo. D. Phillips

No. 666,707. Patented Jan. 29, 1901.
F. B. SHUSTER.
WIRE STRAIGHTENING AND CUTTING MACHINE.
(Application filed June 8, 1899.)
(No Model.) 4 Sheets—Sheet 4.

WITNESSES
H. H. Lamb
L. R. Hoyt

INVENTOR
Franklin B. Shuster
By his Atty.
Geo. O. Phillips

UNITED STATES PATENT OFFICE.

FRANKLIN B. SHUSTER, OF NEW HAVEN, CONNECTICUT.

WIRE STRAIGHTENING AND CUTTING MACHINE.

SPECIFICATION forming part of Letters Patent No. 666,707, dated January 29, 1901.

Application filed June 8, 1899. Serial No. 719,766. (No model.)

*To all whom it may concern:*

Be it known that I, FRANKLIN B. SHUSTER, a citizen of the United States, and a resident of New Haven, in the county of New Haven and State of Connecticut, have invented certain new and useful Improvements in Wire Straightening and Cutting-Off Machines, of which the following is a specification.

My invention relates to an improvement in wire straightening and cutting-off machines; and it consists in certain details of construction to be hereinafter more fully described, and such features believed to be new and novel particularly pointed out in the claims.

To enable others to understand my invention, reference is had to the accompanying drawings, in which—

Figure 1:
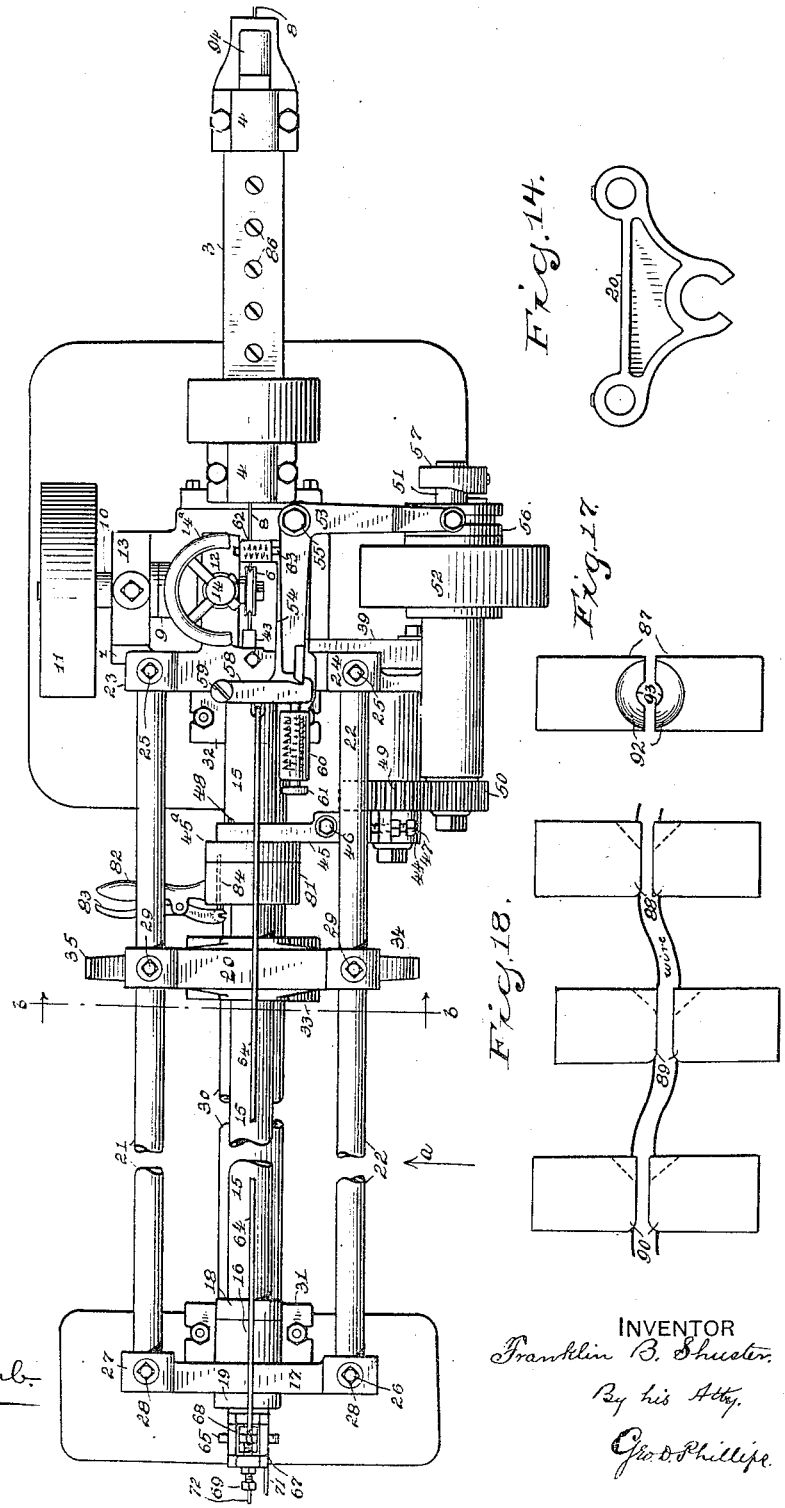
Figure 2:
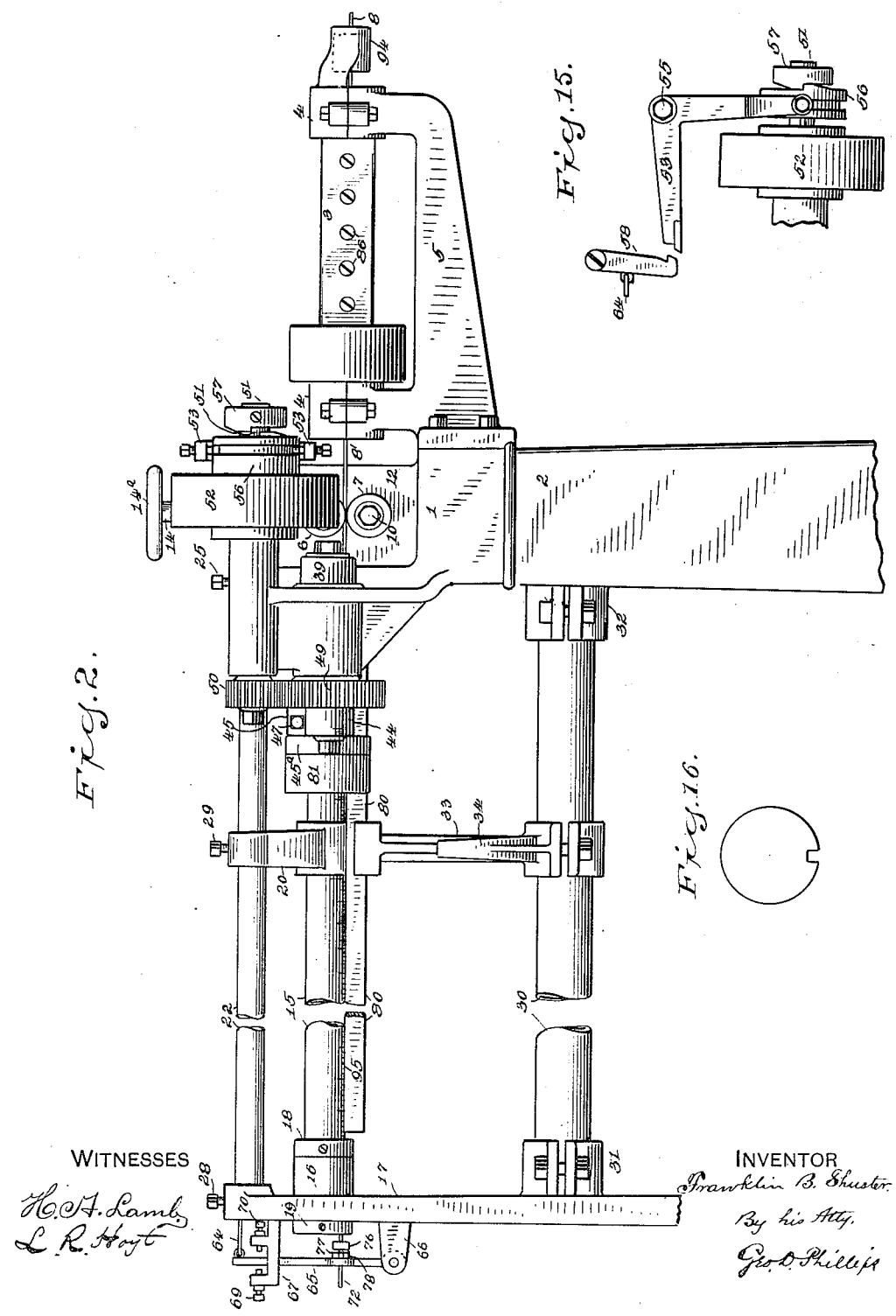
Figure 3:
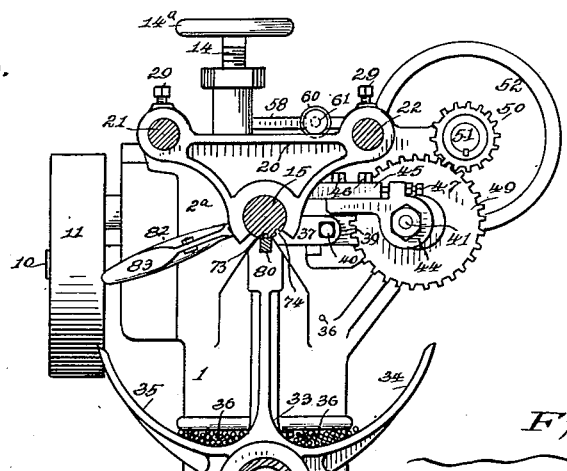
Figure 10:
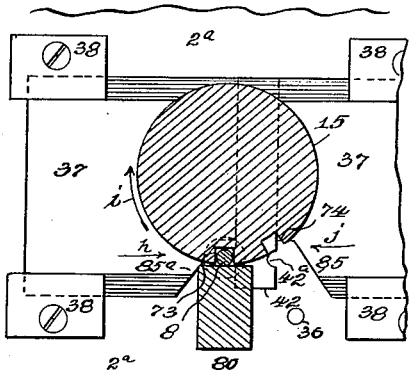
Figure 11:
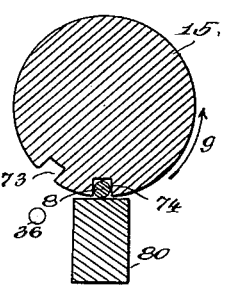
Figure 12:
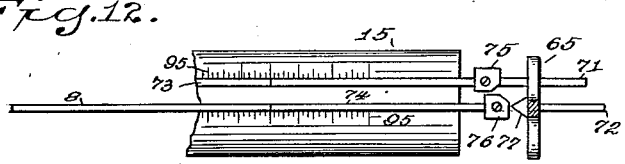
Figure 13:
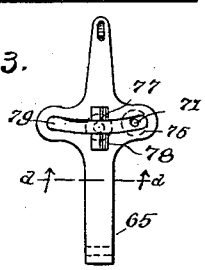
Figure 4:
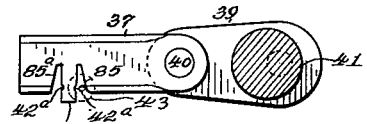
Figure 5:
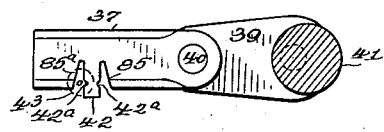
Figure 6:
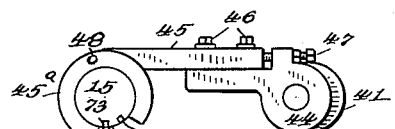
Figure 7:
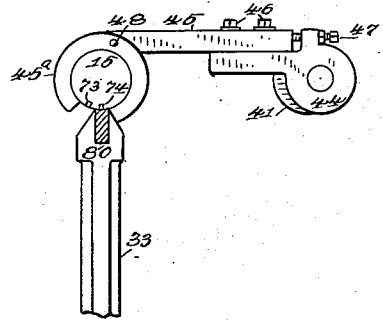
Figure 9:
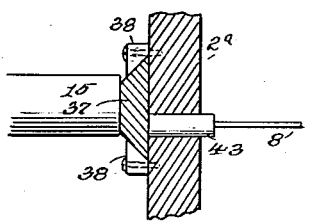
Figure 8:
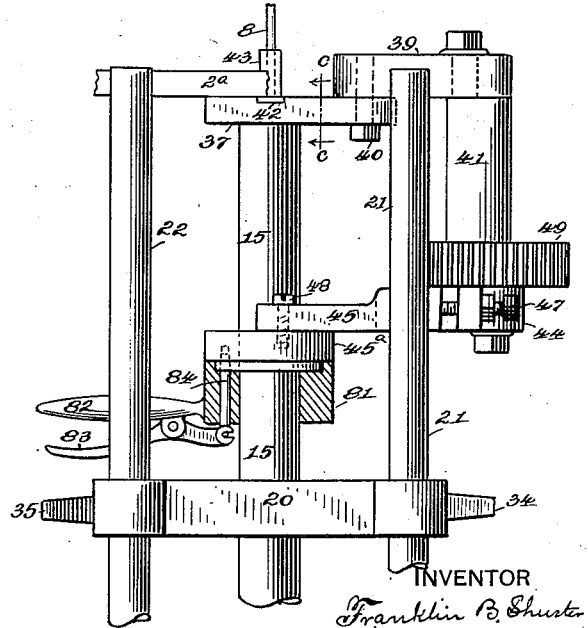

Figure 1 is a broken upper plan view of the machine and broken view of the hand-wheel attached to one of the screws of the feed-roll mechanism. Fig. 2 is a broken side elevation of the machine looking in the direction of arrow *a* of Fig. 1. Fig. 3 is a sectional view of the machine through line *b* of Fig. 1. Fig. 4 is a detail side elevation of the cutter-bar carrying the wire-cutter and the crank to which said cutter-bar is pivotally attached, showing a sectional view of the eccentric shaft on which said crank is mounted, also end view of the wire-bushing, said cutter being moved to the left of said bushing. Fig. 5 is a detail view similar to Fig. 4, showing the cutter moved to the right of the wire-bushing. Fig. 6 is a detail side elevation of one of the wire-receiving brackets, showing a sectional view of its tubular supporting-rod, an end view of the oscillating wire-guide bar, and mechanism for oscillating such bar, which bar is shown turned or rotated to the right. Fig. 7 is a detail broken view of the shank of the wire-receiving bracket, also end elevation of the wire-guide bar, and a side elevation of its oscillating mechanism, said guide-bar turned to the left. Fig. 8 is a broken upper plan view of the tie-rods of the machine, broken front face of the machine-head, broken view of the guide-bar, sectional view of a collar whereby the guide-bar is operated by hand, a handle and lever pivoted thereto for locking and unlocking said guide-bar, and mechanism for operating the cutter and guide-bars. Fig. 9 is a broken detail sectional view of the front face of the machine-head, showing a wire-bushing therein, a sectional view of the cutter-bar lying against such front face of said machine-head, and a broken side elevation of the oscillating guide, this figure being taken on line *c* of Fig. 8. Fig. 10 is an enlarged detail sectional view of the oscillating guide-bar with a section of wire therein, showing a supporting-bar for the wire while in one of the grooves of the guide-bar, said guide-bar rotated to the right, and showing a rod-section discharged therefrom, a broken view of the cutter-bar and caps therefor, and a broken view of the machine-head. Fig. 11 is an enlarged detail sectional view of the guide-bar rotated to the left and showing a wire section discharging therefrom, a sectional view of the wire-supporting bar or rod with the wire in one of the grooves of the guide-bar and resting on said supporting-bar. Fig. 12 is a broken detail view of the lower surface of the guide-bar and that portion of such bar which is intended to be supported in the rear standard of the machine, showing stop-rods for determining the length of the wire sections to be cut, a section of wire in one of the grooves of the guide-bar, and a section of the trip-lever through line *d* of Fig. 13. Fig. 13 is a detail front elevation of the trip-lever, showing the positions of the collars of the stop-rods in dotted lines. Fig. 14 is a detail side elevation of one of the guide-bar-supporting brackets. Fig. 15 is a broken view of the driving-shaft and the driving-pulley thereon, the clutch-lever shown disengaged from its catch, and a broken view of the wire connecting such catch with the trip-lever at the rear of the machine. Fig. 16 is a detail end elevation of the oscillating wire-guide bar, showing one wire-groove therein. Fig. 17 is a detail front elevation of a pair of straightener-dies, showing the mouth of such dies tapered to admit the wire freely. Fig. 18 shows detail side elevations of three pairs of straightening-dies set off for straightening wire.

Its construction and operation are as follows:

1 is the machine-head, and 2 the front supporting-standard.

3 is an ordinary rotatable wire-straightener journaled in the bearings 4, which journals form part of the frame 5, attached to the machine-head.

6 and 7, Fig. 2, are the feed-rolls for the wire 8, delivered from the straightener. These rolls are of the usual construction and are mounted upon shafts connected together (see also Fig. 1) by gears 9, one only being shown. On the outer end of the lower roll-shaft 10 is mounted the driving-pulley 11.

12 and 13 are the standards for supporting the roll-shaft mechanism.

14 is an adjusting-screw carrying the hand-wheel 14ª for adjusting the feed-rolls.

15 is the oscillating wire-guide bar, whose rear end is journaled in the boss 16 of the rear standard 17. 18 and 19 are collars secured to said guide-bar between the boss 16 and the back of the rear standard 17 to prevent end play in the said guide-bar. The main body of said guide-bar is journaled in the bracket 20, supported on the tie-rods 21 and 22. These tie-rods are secured in the branch arms 23 and 24, Fig. 1, of the machine-head by the set-screws 25 and to the branch arms 26 and 27 of the rear standard 17 by the set-screws 28, while the bracket 20 is secured to the tie-rods by the set-screws 29.

30 is a large tubular rod whose ends are secured in the boxes 31 and 32 of the front and rear machine-standards.

33, Figs. 2 and 3, is one of several wire-receiving brackets or supports placed at intervals on the tubular rod 30, and it is provided with branches or arms 34 and 35 to receive the straightened and cut wires 36 as they are discharged from the oscillating guide-bar 15 in the manner presently to be described. It will be understood that there are several of these wire-receiving brackets or supports and also a plurality of the guide-bar-supporting brackets 20; but to avoid complication one only of each is shown.

37, Figs. 3, 4, 5, 8, 9, and 10, is the cutter or sliding bar supported, Figs. 9 and 10, by the caps 38 to the outer face 2ª of the machine-head, in which caps it is made to oscillate by being pivotally connected to the crank 39 by means of the bolt 40. This crank is connected to one end of the eccentric shaft 41.

42 is a detachable cutter let into the face of the sliding bar and is flush with the outer vertical face of the machine-head 2ª.

42ª indicates semicircular grooves on each side of the cutter to engage the wire and sever it.

43 is a bushing in the front face 2ª of the machine-head, through which the wire from the rotary straightener passes.

44 is an arm eccentrically mounted on the opposite end of the eccentric shaft 41 and carries the bar 45, adjustably connected to said arm by means of the set-screws 46. 47 is an adjusting-screw for said bar. The opposite end of said bar is pivotally connected to the fixed collar 45ª on the oscillating guide-bar 15 by means of the screw 48, Fig. 8. It will thus be seen that the guide-bar 15 is made to oscillate in a circular path and in close proximity to the cutter-bar, while such cutter-bar is moved in a horizontal path by means of the eccentric shaft 41 and its intermediate connections, just described.

49 is a gear on the shaft 41, that registers with the pinion 50, mounted on the driving-shaft 51, the latter carrying the driving-pulley 52.

53, Fig. 1, is a bell-crank clutch-lever pivotally supported on the fixed plate 54 by means of the screw 55. The forked end of this lever is connected with the collar 56, operatively mounted on the shaft 51 and having a clutch-face to engage with a clutch-face on the collar 57, also rigidly mounted on the shaft 51. (Shown also at Fig. 2.) The free end of the clutch-lever 53 is adapted to engage alternately with the catch 58, pivotally supported on the plate 54 by means of the screw 59. 60 is a housing integral with said plate and carrying the spring-pin 61, adapted to maintain the engagement between the catch 58 and the said clutch-lever. 62 is another housing integral with said plate and carrying the spring-pin 63, adapted to tilt the clutch-lever 53 when disengaged from the catch 58 and throw the clutch-collar 56 out, and thus bring the mechanism connected with the reciprocating guide-bar 15 and the cutter-bar 37 from a state of rest into active operation.

64 is a wire connecting the trip-lever 65 at the rear of the machine and the catch 58, whereby such catch is brought under the control of said trip-lever. This trip-lever, Fig. 2, is pivotally connected to the ear 66, projecting from the rear standard 17. 67 is a bracket also projecting from said rear standard and has the opening 68, Fig. 1, to freely admit the upper end of this trip-lever. 69 and 70 are adjusting-screws that limit the movement of the said trip-lever.

71 and 72, Fig. 12, are two stop wires or rods adapted to lie in the grooves 73 and 74 in the under surface of the guide-bar 15.

75 and 76 are adjustable collars on the stop wires or rods adapted to engage alternately with the angular projections 77 and 78 (see also Fig. 13) on each side of the slot 79 in the trip-lever. This slot is provided to allow the stop-wires to project beyond the trip-lever.

The operation of the machine is as follows: The wire is fed from the straightener-head 3 through the feed-rolls and bushing 43 and on one side or the other of the cutter 42, as the case may be, and into one or the other of the grooves in the lower side of the oscillating guide-bar 15 until, for instance, the end of the wire impinges, Fig. 12, against the stop-rod 72 and forces the collar 76 on such rod against the projections 77 and 78 of the trip-lever 65. This movement, as before mentioned, will move the catch 58, and the lever 53 being released therefrom will drop, as shown at Fig. 15. Instantaneously with this action just described the guide-bar 15 will rotate in the direction of arrow $g$, Fig. 11, and the cutter-bar 37 in the direction of arrow $h$, Fig. 10, which operation will sever a section from the wire and permit such section to be discharged to the right, as shown, and into the branch 34 of the bracket 33, Figs. 3 and 6. It will be understood that when the clutch-collar 56 is in, as shown at Figs. 1 and 2, the pulley 52 is running idle and the mechanism operating the guide-bar 15 and the cutter-bar 37 is at a standstill, and when said collar is out, as shown at Fig. 15, the clutch mechanism (not shown) will lock the pulley 52 and the shaft 51 together. The said shaft will then make one revolution and rotate the guide-bar into the position shown at Fig. 10—viz., with the groove 73 in line to receive another length of wire from the straightener and the groove 74 elevated to discharge a severed section therefrom. This movement will also bring the collar 75, Fig. 12, of the stop-rod 71 in line with the projections 77 and 78 of the trip-lever 65. As soon as the revolution of the shaft 51 is fully completed the engagement of the clutch-faces of the collars 56 and 57 will force the collar 56 to the left and effect the reëngagement of the clutch-lever 53 with its catch 58. This will cause the driving-pulley 52 to run idle until the trip-lever is again actuated, when the guide-bar will be rotated in the direction of arrow $i$ and the cutter-bar in the direction of arrow $j$, which will deliver the severed section to the left, as shown at Fig. 11. The severing of the sections is accomplished by the cutter 42 running close to the outer end of the bushing 43, Fig. 8, the grooves 42ª in the edges of said cutter engaging with the wire.

It will be observed that the guide-bar 15 and the cutter-bar 37, carrying the cutter, move in the same direction; but as the said guide-bar moves in a circular path while the cutter-bar moves in a straight line or a distance represented by the chord of the arc of the circular movement of the guide-bar the cutter-bar will move a little in advance, so that the severing will be accomplished without that sudden jar which straightening and cutting-off machines are subjected to.

80 is a rectangular supporting-bar mounted in the upper forked ends of the several wire-section-receiving brackets. This bar runs practically the full length of the guide-bar 15 and just close enough to avoid contact therewith. Its purpose is to support the wire fed through the grooves of the said guide-bar until such guide-bar delivers it therefrom.

81, Figs. 1 and 8, is a collar rigidly mounted on the guide-bar 15 and abuts the collar 45ª.

82 is a handle secured to the collar 81. 83 is a lever pivotally supported on the said handle which connects at its inner end with the locking-pin 84, adapted to pass through the collar 81 and into the collar 45ª. The object of this construction is to operate the guide-bar 15 independently. In other words, when necessary to oscillate said guide-bar by hand in order to adjust the throw of the bar 45 the connection between collars 81 and 45ª is broken by simply compressing the lever 83.

Referring to Figs. 4, 5, and 10, it will be observed that the cutter-bar 37 is cut away, so as to leave the openings 85 and 85ª on each side of the cutter 42. This will give a free passage to the wire from the bushing 43 to the guide-bar 15.

It will be observed that the bracket 20 (one only being shown, as before mentioned) and the collars 45ª and 81 are cut away on their under side, as shown at Figs. 3, 6, 7, and 14, so as to permit a free delivery of the severed wire sections from the oscillating guide-bar.

An improvement in the straightening-dies of the machine is shown at Figs. 17 and 18, which consists in providing a taper mouth for the dies to facilitate threading the wire therein.

My improvement consists, as before mentioned, in providing the dies 87, 88, 89, and 90 with the taper mouth 92 to facilitate threading the wires therein. Heretofore before introducing a fresh wire into the straightening-dies it was necessary to adjust the screws 86 so as to bring their semicircular openings 93, Fig. 17, on a line, so that the wire would pass freely through the dies and then offset the dies again, as shown at Fig. 18. I taper out the mouth in the front face of each pair of dies, so that in introducing a fresh piece of wire the end of such wire will impinge against the tapered walls of the mouth and be deflected between the dies, which operation is accomplished without shifting the dies.

94, Figs. 1 and 2, is a projection separated a short distance from the front end of the straightener-head and containing waste or other like material saturated with oil for the purpose of lubricating the wire before it reaches the straightening-dies.

95, Figs. 2 and 12, is a graduated scale marked on the guide-bar 15 and running into or close to each of the wire-grooves 73 and 74 of such guide-bar. This feature affords means whereby the stop-rods 71 and 72 can be set so as to cut off wire sections of any desired length. The said stop-rods are set by loosening the screws of their collars 75 and 76 and bringing the inner ends of such rods to any desired mark on the scale, and the distance between the ends of these rods and the front or inner face of the guide-bar will represent the length of the wire section to be severed.

The manner of cutting off, which takes place by the simultaneous movement of the guide-bar and the cutter-bar moving in the same direction, as before described, causes little or no vibration to the machine, and consequently there is not the necessity of constructing the machine as heavy as heretofore required, thus effecting a great saving of material, particularly noticeable where large rods are cut. With the aid of the stop-rods and the scale on the guide-bar very short sections can be cut to accurate lengths.

While I show certain mechanical elements whereby the guide-bar and cutter-bar are set in motion by the feed of the wire acting indirectly upon a clutch-lever, it will be understood that said clutch-lever and the trip-lever may be electrically connected and operated substantially as shown in the patent granted to me June 21, 1898, No. 605,928. It will be understood, too, that the guide-bar feature can be used independent of the straightening-dies where it is necessary simply to cut off and not straighten the wire. It will be understood also that while I show a removable cutter in a bar for severing a section of wire this cutter and bar can, if necessary, be made of one piece of metal.

Having thus described my invention, what I claim as new, and desire to secure by Letters Patent, is—

1. The herein-described improvement in machines of the character described, consisting of an oscillating guide-bar, one or more longitudinal grooves in said bar through which the wire is fed, a cutter adapted to operate in close proximity to the front end of said bar to sever a section from the wire in said groove or grooves, for the purpose set forth.

2. The herein-described improvement in machines of the character described, consisting of an oscillating guide-bar, supports therefor, longitudinal grooves in said bar adapted to receive the wire, a wire-cutter adapted to move across the end of said bar to sever a section therefrom, means for operating said bar and cutter, for the purpose set forth.

3. The herein-described improvement in wire straightening and cutting-off machines, consisting of a wire-guide bar adapted to oscillate, supports for said bar, longitudinal grooves in the periphery of such bar to receive the wire delivered from the straightener, a support below said guide-bar and in close proximity thereto to support the feeding wire, a wire-cutter adapted to move across the feeding-line of the wire and in close proximity to the end of said guide-bar, for the purpose set forth.

4. The herein-described improvement in wire straightening and cutting-off machines, consisting of an oscillating guide-bar, longitudinal grooves in the periphery of said bar, a wire-cutter adapted to operate across the feeding-line of the wire, said guide-bar adapted to deliver a wire section on each side of the wire-feeding line, for the purpose set forth.

5. The herein-described improvement in wire straightening and cutting-off machines, consisting of an oscillating guide-bar, longitudinal grooves therein to receive the wire delivered from the straightener, a support for the wire situated below said bar, a cutter adapted to operate across the wire-feeding line and to move in the same direction with said guide-bar but a trifle faster, said guide-bar adapted to deliver a wire section on either side of the wire-feeding line, for the purpose set forth.

6. The herein-described improvement in wire straightening and cutting-off machines, consisting of an oscillating grooved guide-bar to receive the wire fed from the straightener and adapted to deliver a severed section therefrom on either side of the wire-feeding line, a reciprocating cutter adapted to operate across the wire-feeding line and cut a section from the wire when moving in either direction, for the purpose set forth.

7. The herein-described improvement in wire straightening and cutting-off machines, consisting of an oscillating longitudinally-grooved guide-bar adapted to receive the wire delivered from the straightener and deliver a severed section therefrom, alternately on both sides of the wire-feeding line, a reciprocating cutter operating across the wire-feeding line so as to sever a section from the wire when moving in either direction, stop-rods to limit the feed of the wire, for the purpose set forth.

8. The herein-described improvement in wire straightening and cutting-off machines, consisting of an oscillating longitudinally-grooved guide-bar adapted to receive the wire delivered from the straightener and discharge a severed section therefrom on either side of the wire-feeding line, a reciprocating cutter adapted to cut both ways while moving across the wire-feeding line, stop-rods located in the guide-bar grooves, a measuring-scale to determine the lengths of the wire sections, a trip-lever with which such rods alternately engage so as to set in motion the guide-bar and wire-cutter mechanism, for the purpose set forth.

9. The herein-described improvement in a wire straightening and cutting-off machine, consisting of a longitudinally-grooved guide-bar adapted to receive the wire fed from the straightener, adjustable stop-rods in said grooves adapted to engage the tripping mechanism and set in motion the guide-bar-oscillating and cutter-reciprocating mechanism, for the purpose as set forth.

10. The herein-described improvement in a wire straightening and cutting-off machine, consisting of an oscillating longitudinally-grooved guide-bar, the grooves in said guide-bar adapted to oscillate across the wire-feeding line to receive the wire delivered from the straightener, a support under said bar to hold the wire in the groove of the said bar directly on the wire-feeding line, said bar adapted to discharge a severed section on either side of said feeding-line, a receptacle to receive such section, a reciprocating double-edge cutter adapted to operate across such feeding-line, for the purpose set forth.

11. The herein-described improvement in a wire-straightening machine, consisting of an oscillating longitudinally-grooved guide-bar, stop-rods in said grooves to determine the length of the wire sections, a support below said bar for the wire, a reciprocating double-edge cutter to operate across the wire-feeding line, mechanism for oscillating the guide-bar and reciprocating the said cutter, means whereby such mechanism is connected with the stop-rods of said guide-bar, so that when the wire is feeding into the guide-bar such mechanism is stationary and when the end of the wire reaches one of the stop-rods such mechanism is actively operated to sever a wire section and discharge such section from the guide-bar, for the purpose set forth.

12. The herein-described improvement in wire straightening and cutting-off machines, consisting of an oscillating longitudinally-grooved guide-bar adapted to receive the wire delivered from the straightener and a reciprocating double-edge cutter, combined with operating mechanism for said bar and cutter, for the purpose set forth.

13. The herein-described improvement in wire straightening and cutting-off machines, comprising in combination with front and rear supporting-standards, overhead tie-rods, brackets mounted on said rods provided with bearings, an oscillating longitudinally-grooved guide-bar journaled in said bearings, such bearings having openings to correspond to the oscillatory movement of said guide-bar, a reciprocating cutter, a rod, supporting-receptacles to receive severed wire sections as they are discharged from said guide-bar, said rod situated beneath such guide-bar, and supported in the machine-standards, combined with oscillating mechanism for such bar and reciprocating mechanism for the cutter, for the purpose set forth.

14. The herein-described improvement in wire straightening and cutting-off machines, consisting in combination with the two supporting-standards, of tie-rods connecting such standards, wire-guide-rod-supporting brackets depending from said rods, a work-receptacle-supporting shaft below said brackets and anchored in said standards, double-branch work-receptacles mounted on said shaft, for the purpose set forth.

Signed at Bridgeport, in the county of Fairfield and State of Connecticut, this 7th day of June, A. D. 1899.

FRANKLIN B. SHUSTER.

Witnesses:
SIG. DORMITZER,
F. A. FAIRCHILD.